United States Patent
Usuda et al.

(10) Patent No.: US 7,817,597 B2
(45) Date of Patent: Oct. 19, 2010

(54) TRANSMISSION RATE CONTROL METHOD, MOBILE STATION, RADIO BASE STATION, AND RADIO NETWORK CONTROLLER

(75) Inventors: Masafumi Usuda, Yokosuka (JP); Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 557 days.

(21) Appl. No.: 11/391,266

(22) Filed: Mar. 29, 2006

(65) Prior Publication Data

US 2006/0221923 A1    Oct. 5, 2006

(30) Foreign Application Priority Data

Mar. 29, 2005   (JP)   ............................ P2005-096564

(51) Int. Cl.
*H04W 4/00* (2009.01)
(52) U.S. Cl. .................. 370/329; 370/328; 370/347; 370/468; 455/452.1; 455/67.11; 455/69; 455/522
(58) Field of Classification Search .................. 455/69, 455/522, 450–452.2, 67.11; 370/328, 338, 370/469, 329, 337, 347
See application file for complete search history.

(56) References Cited

U.S. PATENT DOCUMENTS

| | | | | |
|---|---|---|---|---|
| 5,982,813 | A * | 11/1999 | Dutta et al. ................. | 375/219 |
| 5,987,019 | A * | 11/1999 | Raith et al. ................. | 370/347 |
| 6,549,785 | B1 * | 4/2003 | Agin ........................... | 455/522 |
| 6,564,067 | B1 * | 5/2003 | Agin ........................... | 455/522 |
| 6,574,211 | B2 * | 6/2003 | Padovani et al. ............ | 370/347 |
| 7,209,517 | B2 * | 4/2007 | Sindhushayana et al. .... | 375/225 |
| 7,230,937 | B2 * | 6/2007 | Chi et al. ..................... | 370/329 |
| 7,317,921 | B2 * | 1/2008 | Mueckenheim et al. .. | 455/452.1 |

(Continued)

OTHER PUBLICATIONS

Search Report issued on Jul. 3, 2006 in the counterpart European application: Application No. 06006542.2-2412: Applicant—NTT DoCoMo, Inc.
Prior art reference cited in the above mentioned Search Report: "Feasibility study for enhanced uplink for UTRA FDD (Release 6) 3GPP TR 25.896", 3GPP TR 25.896 V6.0.0, Mar. 2004, page complete, XP002322111.
Prior art reference cited in the above mentioned Search Report: Samsung, "EUL scheduling: signalling support", 3GPP TSG RAN WG1 #38 BIS, XX, XX, Sep. 20, 2004, pp. 1-8, XP002375260.
3GPP TS 25.309 v6.1.0 (Dec. 2004): 3rd Generation Partnership Project; Technical Specification Group Radio Access Netwok; FDD Enhanced Uplink; Overall description Stage 2.

*Primary Examiner*—Sharad Rampuria
(74) *Attorney, Agent, or Firm*—Marvin A. Motsenbocker; Mots Law, PLLC

(57) ABSTRACT

A transmission rate control method for controlling transmission rate of layer-2 control information, including: notifying, at a radio network controller, a correspondence of a transmission data block size of the layer-2 control information to a transmission power ratio between an enhanced dedicated physical data channel and a dedicated physical control channel on the layer-2 control information, to a mobile station; determining, at the mobile station, a transmission power ratio of the layer-2 control information to be transmitted based on the correspondence; and transmitting, at the mobile station, the layer-2 control information using the determined transmission power ratio.

7 Claims, 7 Drawing Sheets

U.S. PATENT DOCUMENTS

| | | | |
|---|---|---|---|
| 7,321,780 B2* | 1/2008 | Love et al. | 455/522 |
| 7,385,951 B2* | 6/2008 | Balachandran et al. | 370/329 |
| 7,408,895 B2* | 8/2008 | Zhang et al. | 370/318 |
| 7,447,516 B2* | 11/2008 | Heo et al. | 455/522 |
| 7,542,776 B2* | 6/2009 | Umesh et al. | 455/522 |
| 7,672,256 B2* | 3/2010 | Pan et al. | 370/277 |
| 2003/0219037 A1* | 11/2003 | Toskala et al. | 370/496 |
| 2004/0043783 A1* | 3/2004 | Anderson | 455/522 |
| 2004/0219920 A1* | 11/2004 | Love et al. | 455/442 |
| 2006/0120404 A1* | 6/2006 | Sebire et al. | 370/469 |
| 2006/0221923 A1* | 10/2006 | Usuda et al. | 370/338 |
| 2006/0246935 A1* | 11/2006 | Iochi et al. | 455/522 |
| 2007/0105561 A1* | 5/2007 | Doetsch et al. | 455/450 |
| 2008/0069035 A1* | 3/2008 | Pinheiro et al. | 370/328 |
| 2008/0273492 A1* | 11/2008 | Jeong et al. | 370/329 |
| 2009/0061886 A1* | 3/2009 | Cozzo et al. | 455/450 |
| 2009/0181710 A1* | 7/2009 | Pani et al. | 455/509 |

\* cited by examiner

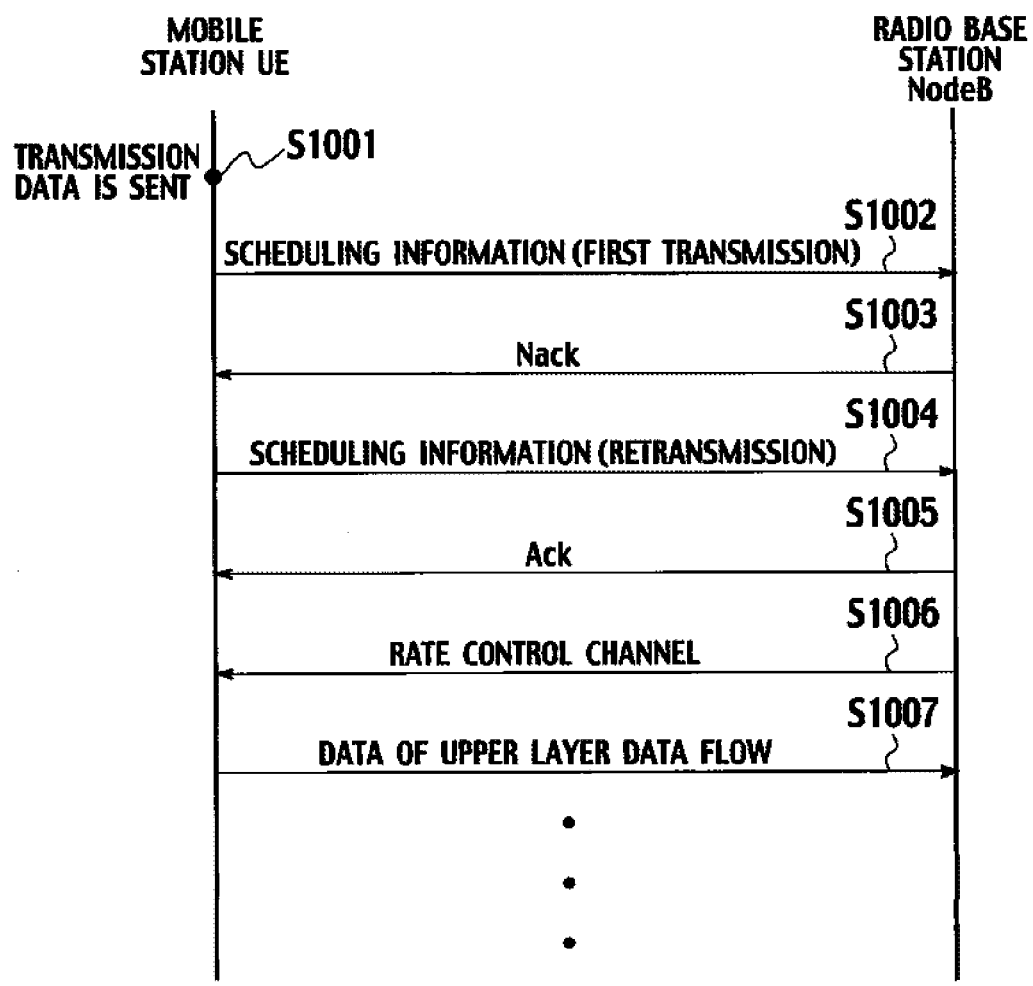

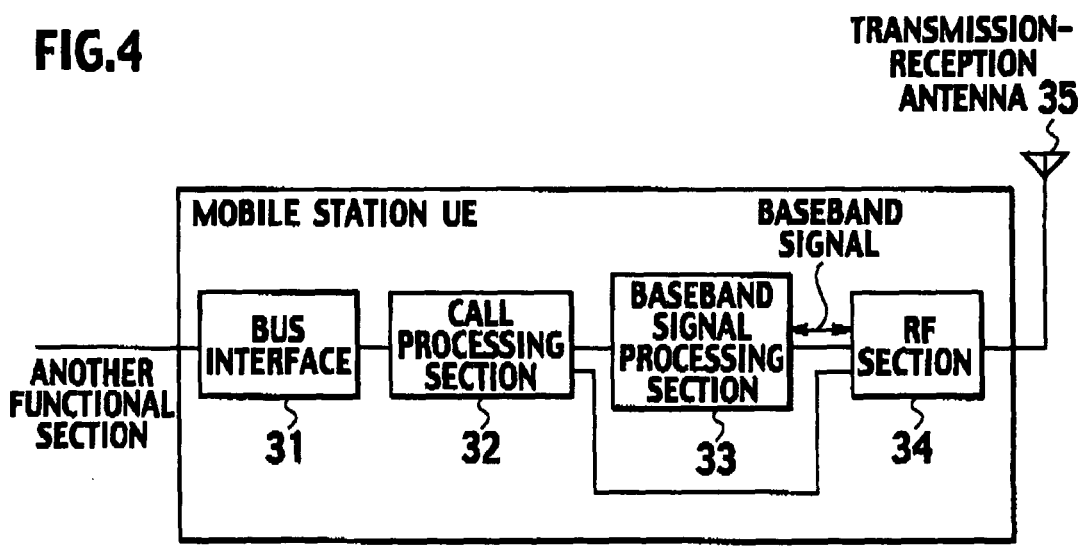
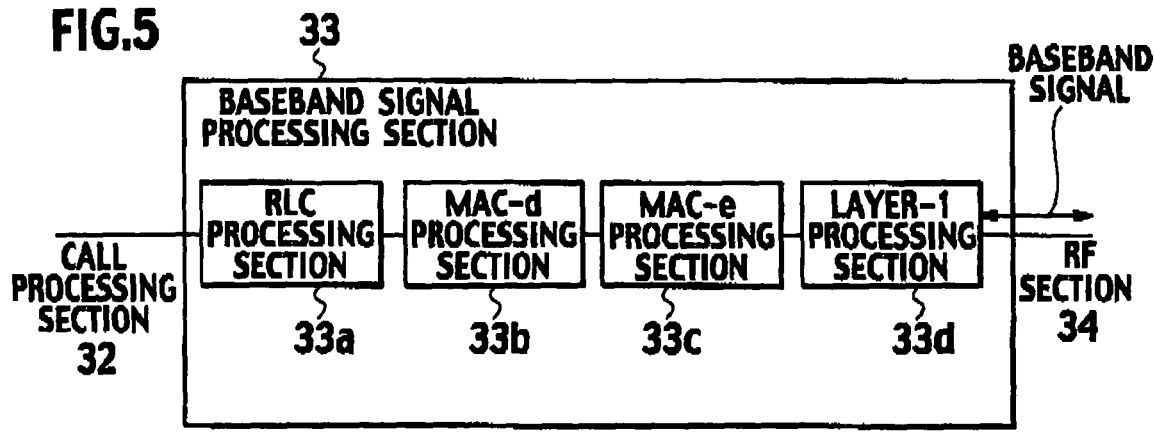
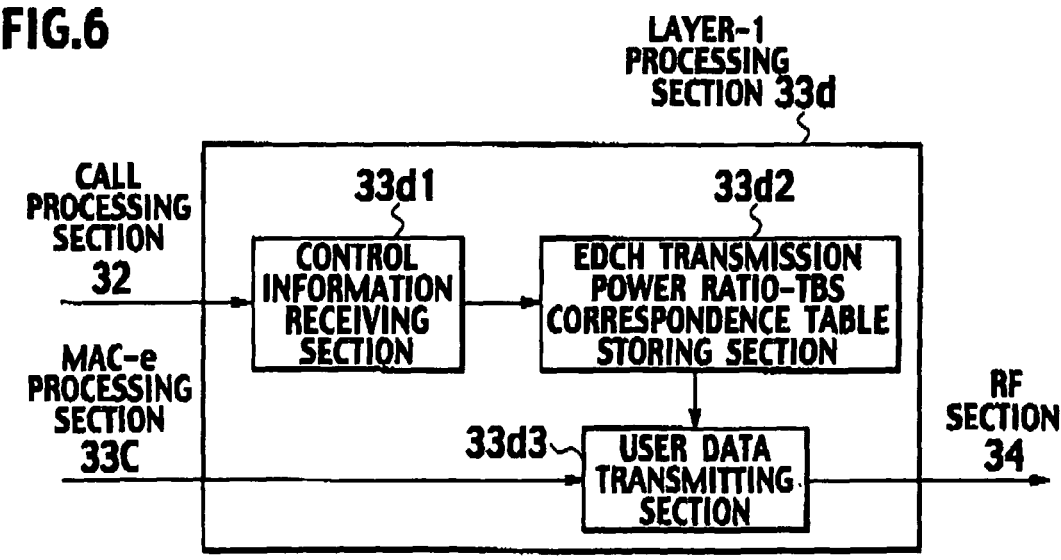

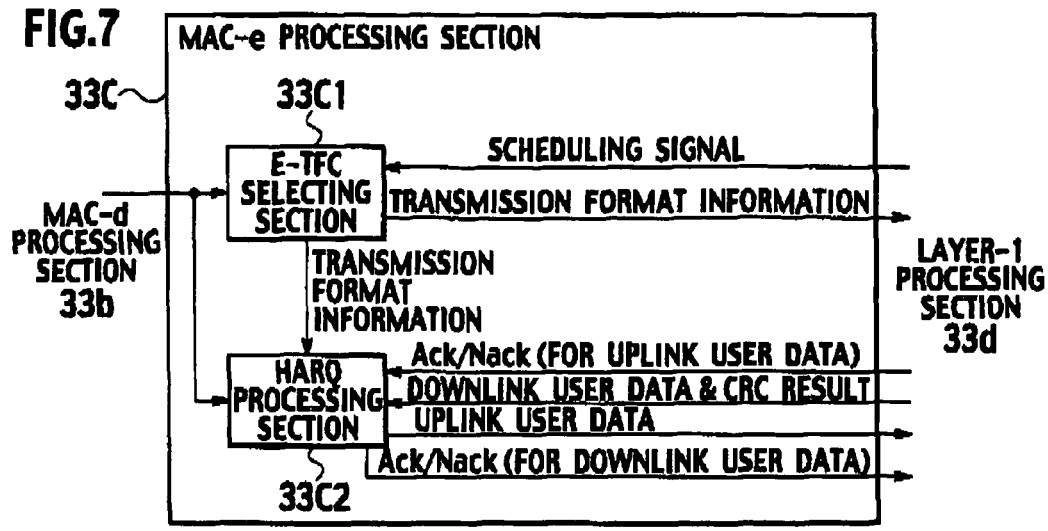
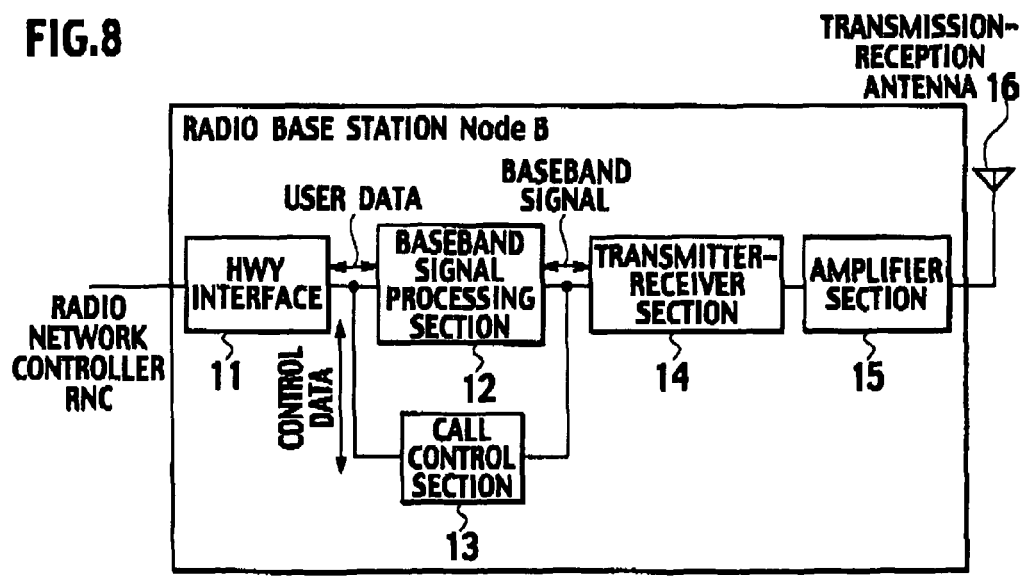
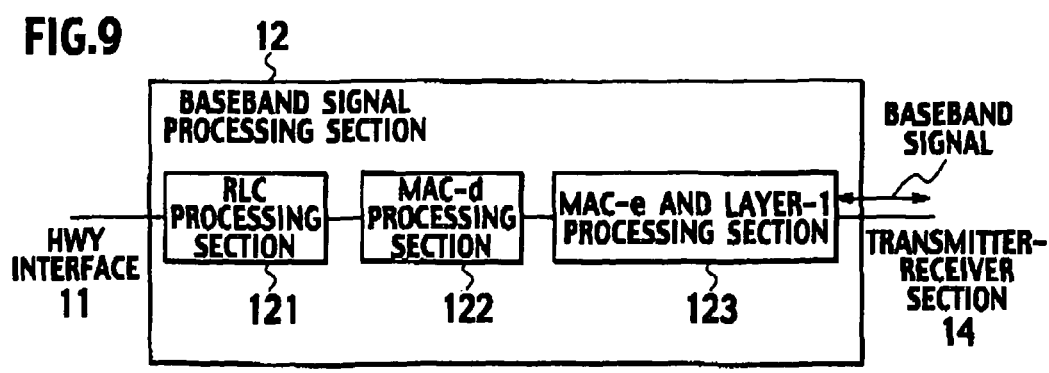

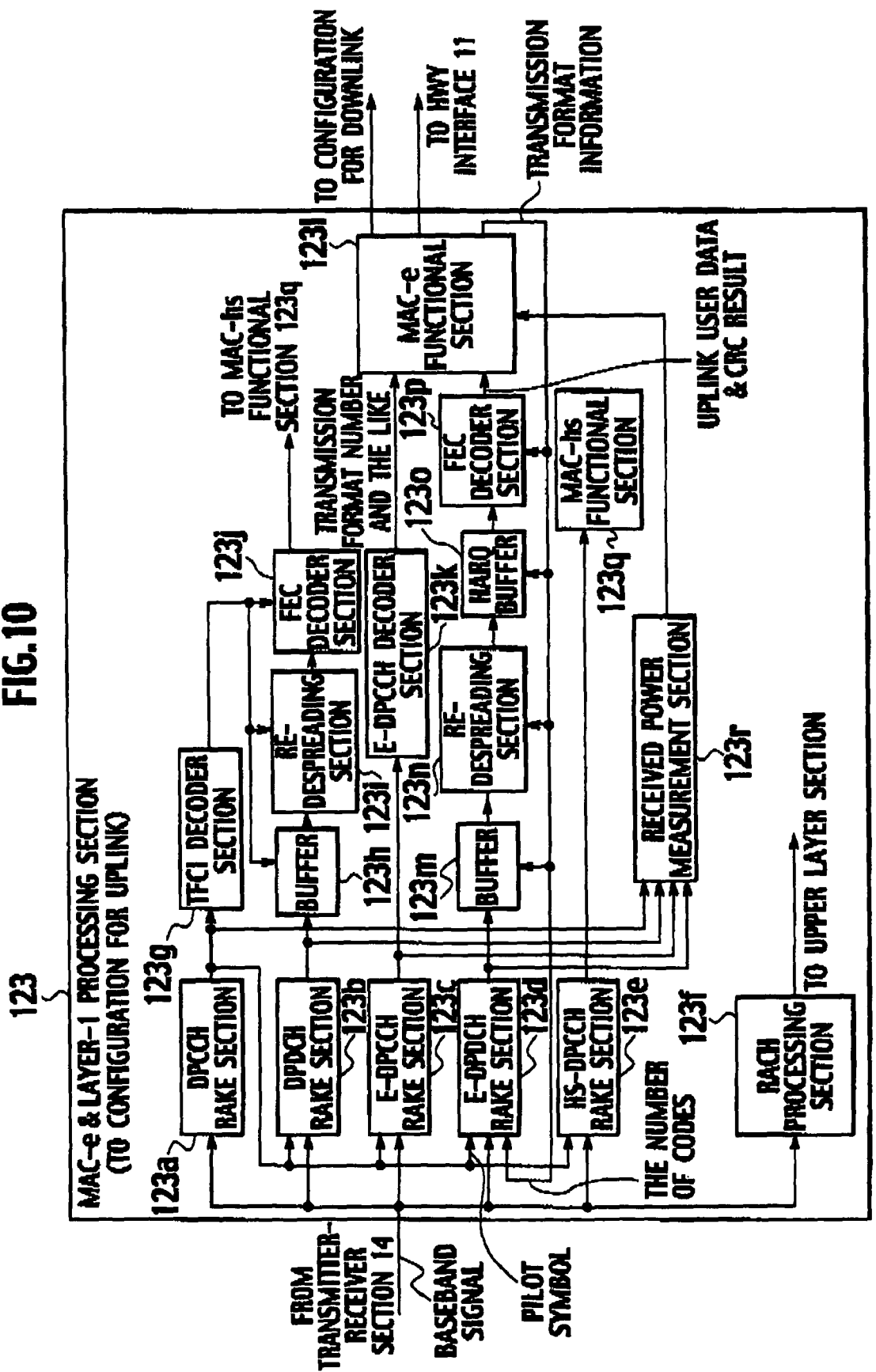

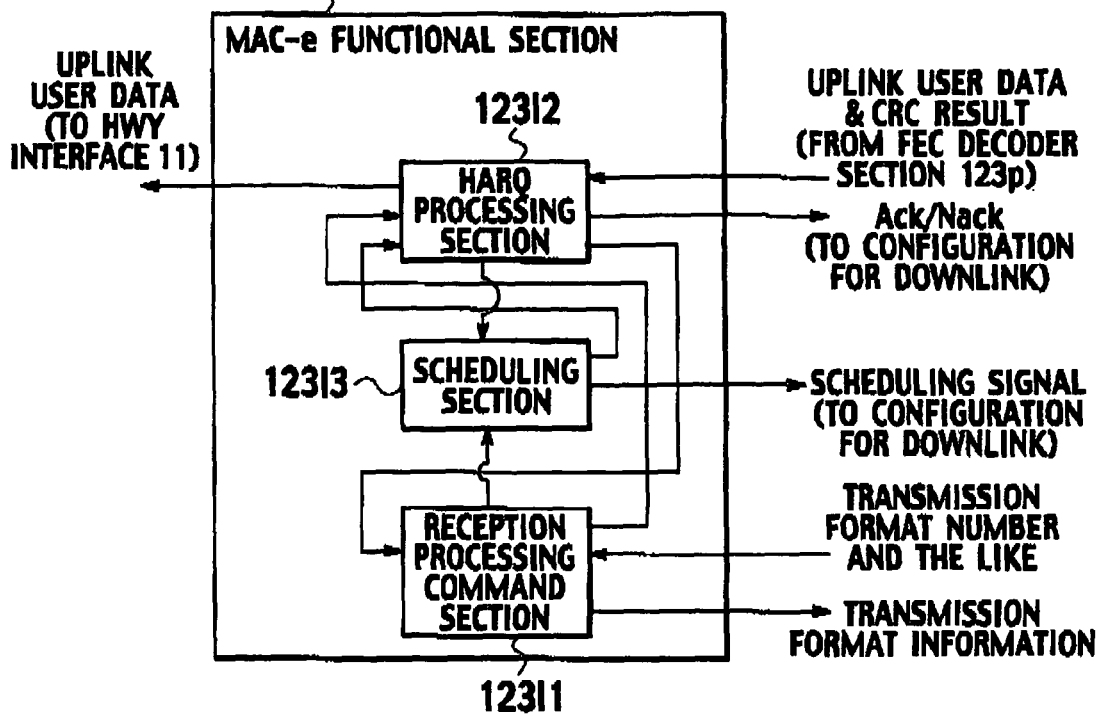
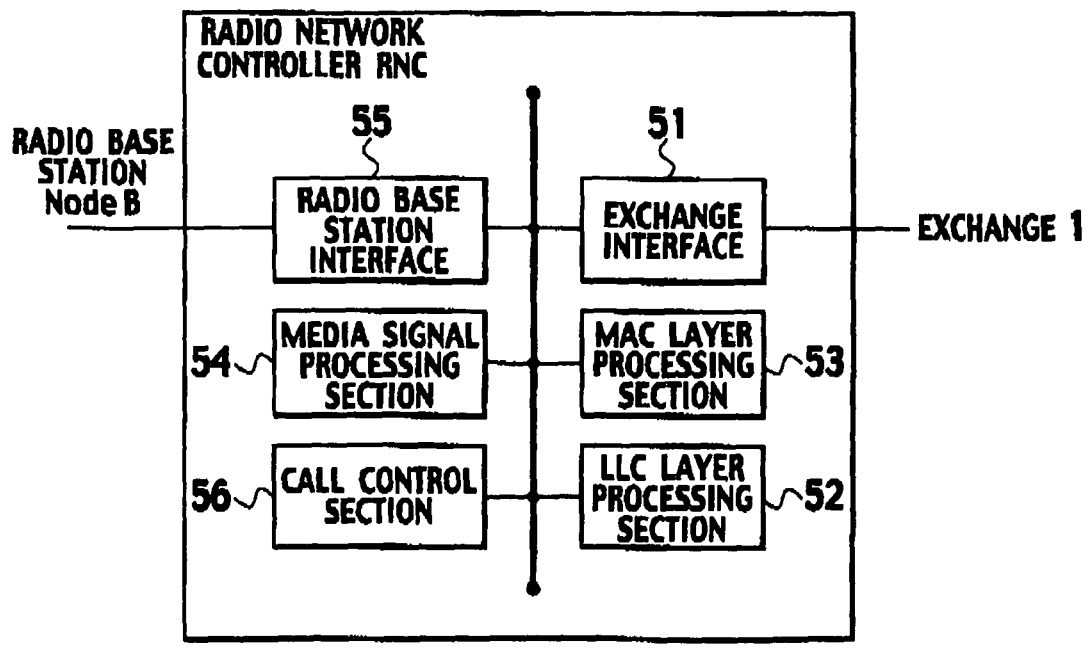

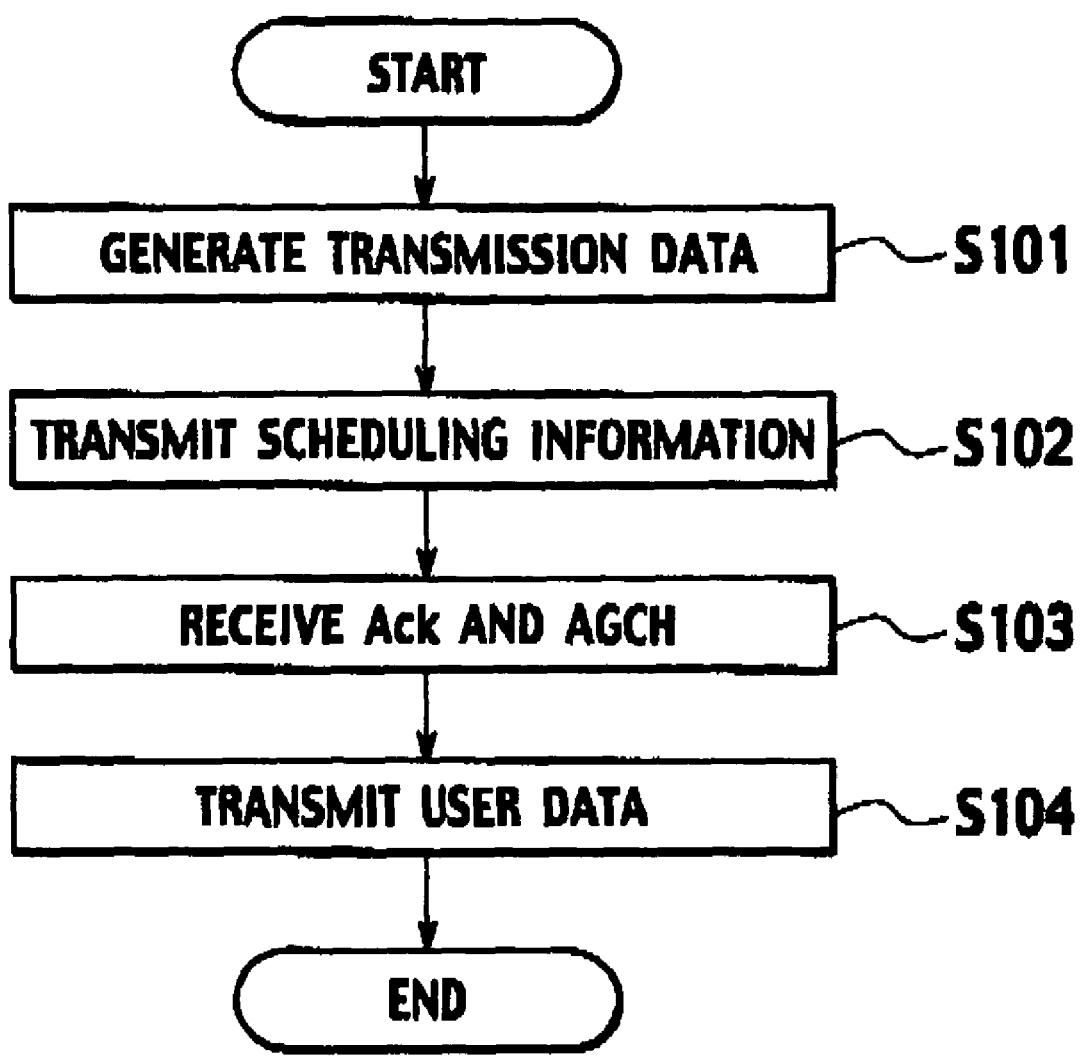

TRANSMISSION RATE CONTROL METHOD, MOBILE STATION, RADIO BASE STATION, AND RADIO NETWORK CONTROLLER

CROSS REFERENCE TO RELATED APPLICATION

This application is based upon and claims the benefit of priority from the prior Japanese Patent Application No. P2005-096564, filed on Mar. 29, 2005; the entire contents of which are incorporated herein by reference.

BACKGROUND OF THE INVENTION

1. Field of the Invention

The present invention relates to a transmission rate control method for controlling transmission rate of an uplink user data, a mobile station, a radio base station, and a radio network controller.

2. Description of the Related Art

In a conventional mobile communication system, in an uplink from a mobile station UE to a radio base station Node B, a radio network controller RNC is configured to determine a transmission rate of a dedicated channel, in consideration of radio resources of the radio base station Node B, an interference volume in an uplink, transmission power of the mobile station UE, transmission processing performance of the mobile station UE, a transmission rate required for an upper application, or the like, and to notify the determined transmission rate of the dedicated channel by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 1, the radio network controller RNC integrally controls a plurality of radio base stations Node B in general. Therefore, in the conventional mobile communication system, there has been a problem that it is difficult to perform fast control for changing of the transmission rate of channel (for example, per approximately 1 through 100 ms), due to processing load, processing delay, or the like.

In addition, in the conventional radio network controller RNC, there has been also a problem that costs for implementing an apparatus and for operating a network are substantially increased even if the fast control for changing of the transmission rate of the channel can be performed.

Therefore, in the conventional mobile communication system, control for changing of the transmission rate of the channel is generally performed on the order from a few hundred ms to a few seconds.

Accordingly, in the conventional mobile communication system, when burst data transmission is performed as shown in FIG. 2A, the data are transmitted by accepting low-speed, high-delay, and low-transmission efficiency as shown in FIG. 2B, or, as shown in FIG. 2C, by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIGS. 2B and 2C.

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the radio resources effectively. Such discussions or discussed functions will be hereinafter referred to as "Enhanced Uplink (EUL)".

In the "Enhanced Uplink", a MAC-layer function, which is located in each cell of a radio base station Node B, is configured to control a transmission rate of uplink user data transmitted by a mobile station UE, using two transmission rate control channels described below.

As a first transmission rate control method, the MAC-layer function located in each cell of the radio base station Node B is configured to transmit an absolute value for a maximum allowable transmission rate of uplink user data (or parameter relating to the maximum allowable transmission rate) to each mobile station UE (individual mobile stations or all mobile stations) using an "Absolute Rate Grant Channel (AGCH)", so as to control the transmission rate of uplink user data of each mobile station UE.

Here, the above-described parameter relating to the maximum allowable transmission rate is a transmission power ratio between an "Enhanced Dedicated Physical Data Channel (E-DPDCH)" and a "Dedicated Physical Control Channel (DPCCH)" (hereinafter, an EDCH transmission power ratio) or the like. This EDCH transmission power ratio is calculated by "transmission power of E-DPDCH/transmission power of DPCCH".

The increase/decrease of the parameter relating to the maximum allowable transmission rate is corresponding to the increase/decrease of the transmission rate, and it is acquired in connection with the transmission rate. In 3GPP, this parameter relating to the maximum allowable transmission rate is defined as the EDCH transmission power ratio (See, Non-Patent literature 1:3GPP TSG-RAN TS25.309 v6.1.0).

As a second transmission rate control method, the MAC-layer function located in each cell of the radio base station Node B is configured to transmit a command indicating relative values such as an "Up Command", a "Down Command", a "Keep Command", or the like, for a maximum allowable transmission rate of uplink user data (or parameter relating to the maximum allowable transmission rate) to each mobile station UE (individual mobile stations or all mobile stations) using a "Relative rate Grant Channel (RGCH)", so as to control the transmission rate of uplink user data of each mobile station UE.

When the mobile station UE transmits uplink user data, the EDCH transmission power ratio which can be accepted by the mobile station UE (a maximum allowable EDCH transmission power ratio of mobile station UE) is determined using the above-mentioned transmission control channels (AGCH and RGCH).

Then, the mobile station UE determines a transmission data block size (TBS: Transport Block Size) per transmission time interval (TTI: Transmit Time Interval), based on the uplink user data size stored in a transmission buffer and the maximum allowable EDCH transmission power ratio of the mobile station UE.

Here, the mobile station UE is configured to determine the transmission data block size (TBS) per transmission time interval (TTI) using a correspondence table which shows correspondence between a transmission data block size (TBS) of uplink user data and the EDCH transmission power ratio.

As shown in Non-Patent literature 2 (3GPP TSG-RAN R2-042717), the radio network controller RNC is configured to notify the correspondence table to the mobile station UE by a layer-3 signaling, when a call setup is performed.

Also, the correspondence table can be set per upper layer flow to which a priority level, Quality of Service, or the like are set.

In the "Enhanced Uplink", the mobile station UE is configured to transmit scheduling information (layer-2 control information) which includes the amount of data stored in a transmission buffer, conditions of transmission power, or the like, to the radio base station Node B, when the mobile station UE has the uplink user data to be transmitted, or the like.

The scheduling information can be configured to be transmitted together with the uplink user data in upper layer flow, or to be transmitted independently.

Referring to FIG. 3, an operation in the mobile station UE when uplink user data to be transmitted is occurred will be described.

As shown in FIG. 3, when the uplink user data to be transmitted is occurred in the mobile station UE, in step S1001, the mobile station UE transmits the scheduling information to the radio base station Node B, so as to request the transmission of uplink user data, in step S1002

In step S1003, the radio base station Node B transmits "Nack" to the mobile station UE, so as to request the retransmission of the uplink user data, when the radio base station Node B fails to perform the reception and decode processing towards the transmitted scheduling information.

In step S1004, the mobile station UE retransmits the scheduling information to the radio base station Node B.

When the radio base station Node B succeeds to perform the reception and decode processing towards the retransmitted scheduling information, in step S1005, the radio base station Node B transmits "Ack" to the mobile station UE. In addition, in step S1006, the radio base station Node B notifies the transmission rate of uplink user data (the EDCH transmission power ratio) to the mobile station UE using the rate control channel (AGCH and/or RGCH).

In step 1007, the mobile station UE determines the transmission data block size (TBS) of uplink user data based on the notified EDCH transmission power ratio, so as to transmit the uplink user data in upper layer flow using the determined transmission data block size (TBS).

In the example shown in FIG. 3, the radio base station Node B succeeded to perform the reception and decode processing toward the second scheduling information transmitted by the mobile station UE.

However, in order to shorten the transmission delay for uplink user data, the scheduling information is preferable to reach the radio base station Node B as soon as possible.

In a conventional mobile communication system using the "Enhanced Uplink", "the correspondence table of the transmission data block size and the EDCH transmission power ratio", which is used when transmitting the scheduling information independently, is not defined yet.

Accordingly, there has been a problem that the sufficient communication quality is not ensured, the retransmission of scheduling information is required often, and the long transmission delay is occurred.

BRIEF SUMMARY OF THE INVENTION

The present invention has been made considering the problems, and its object is to provide a transmission rate control method, a mobile station, a radio base station and a radio network controller, which decrease the transmission delay due to the retransmission of scheduling information and increase the transmission efficiency, in a mobile communication system using the "Enhanced Uplink".

A first aspect of the present invention is summarized as a transmission rate control method for controlling transmission rate of layer-2 control information, including: notifying, at a radio network controller, a correspondence of a transmission data block size of the layer-2 control information to a transmission power ratio between an enhanced dedicated physical data channel and a dedicated physical control channel on the layer-2 control information, to a mobile station; determining, at the mobile station, a transmission power ratio of layer-2 control information to be transmitted, based on the notified correspondence; and transmitting, at the mobile station, the layer-2 control information using the determined transmission power ratio.

In the first aspect, the transmission rate control method can further include: notifying, at the radio network controller, the correspondence to the radio base station; and allocating, at the radio base station, a receive processing resource for layer-2 control information, on the assumption that the mobile station transmits the layer-2 control information using the transmission power ratio which is determined based on the notified correspondence.

A second aspect of the present invention is summarized as a transmission rate control method for controlling transmission rate of layer-2 control information, including: notifying, at a radio network controller, a correspondence of a transmission data block size of an upper layer flow to a transmission power ratio between an enhanced dedicated physical data channel and a dedicated physical control channel on the upper layer flow, to a mobile station; controlling, at the mobile station, the correspondence per upper layer flow, notifying, at the radio network controller, an upper layer flow identifier to the mobile station; determining, at the mobile station, a transmission power ratio of the layer-2 control information to be transmitted, based on the correspondence which corresponds to the notified upper layer identifier; and transmitting, at the mobile station, the layer-2 control information using the determined transmission power ratio.

In the second aspect, the transmission rate control method can further include: notifying, at the radio network controller, the correspondence of the upper layer flow, to the radio base station; controlling, at the radio base station, the correspondence per upper layer flow; notifying, at the radio network controller, the upper layer flow identifier to the radio base station; and allocating, at the radio base station, a receive processing resource for the layer-2 control information, on the assumption that the mobile station transmits the layer-2 control information using the transmission power ratio which is determined based on the correspondence which corresponds to the notified upper layer identifier.

A third aspect of the present invention is summarized as a transmission rate control method for controlling transmission rate of layer-2 control information, including: notifying, at a radio network controller, a correspondence of a transmission data block size of an upper layer flow to a transmission power ratio between an enhanced dedicated physical data channel and a dedicated physical control channel on the upper layer flow, to a mobile station; determining, at the mobile station, a transmission power ratio of the layer-2 control information to be transmitted, based on the correspondence of an upper layer flow which has a highest priority level; and transmitting, at the mobile station, the layer-2 control information using the determined transmission power ratio.

In the third aspect, the transmission rate control method can further include controlling, at the mobile station, the correspondence per upper layer flow.

In the third aspect, the transmission rate control method can further include: notifying, at the radio network controller, the correspondence of the upper layer flow to the radio base station; controlling, at the radio base station, the correspondence per the upper layer flow; and allocating, at the radio base station, a receive processing resource for the layer-2 control information, on the assumption that the mobile station transmits the layer-2 control information using the transmission power ratio which is determined based on the correspondence of the upper layer flow which has the highest priority level.

BRIEF DESCRIPTION OF THE SEVERAL VIEWS OF THE DRAWINGS

FIG. 3 is a sequence diagram showing operations of the conventional mobile communication system.

FIG. 4 is a functional block diagram of a mobile station in the mobile communication system according to an embodiment of the present invention.

FIG. 5 is a functional block diagram of a baseband signal processing section of the mobile station in the mobile communication system according to the embodiment of the present invention.

FIG. 6 is a functional block diagram of a layer-1 processing section of the baseband signal processing section in the mobile station of the mobile communication system according to the embodiment of the present invention.

FIG. 7 is a functional block diagram of a MAC-e processing section of the baseband signal processing section in the mobile station of the mobile communication system according to the embodiment of the present invention.

FIG. 8 is a functional block diagram of a radio base station of the mobile communication system according to the embodiment of the present invention.

FIG. 9 is a functional block diagram of a baseband processing section in the radio base station of the mobile communication system according to the embodiment of the present invention.

FIG. 10 is a functional block diagram of a MAC-e and layer-1 processing section (configured for an uplink) in the baseband signal processing section in the radio base station of the communication system according to the embodiment of the present invention.

FIG. 11 is a functional block diagram of the MAC-e functional section of the MAC-e and layer-1 processing section (configured for the uplink) in the baseband signal processing section in the radio base station of the mobile communication system according to the embodiment of the present invention.

FIG. 12 is a functional block diagram of a radio network controller of the mobile communication system according to the embodiment of the present invention.

FIG. 13 is a flowchart showing operations of the mobile communication system according to the embodiment of the present invention.

DETAILED DESCRIPTION OF THE INVENTION (Configuration of Mobile Communication System According to First Embodiment of the Present Invention)

Referring to FIGS. 4 to 12, a configuration of a mobile communication system according to a first embodiment of the present invention will be described.

Figure 1:
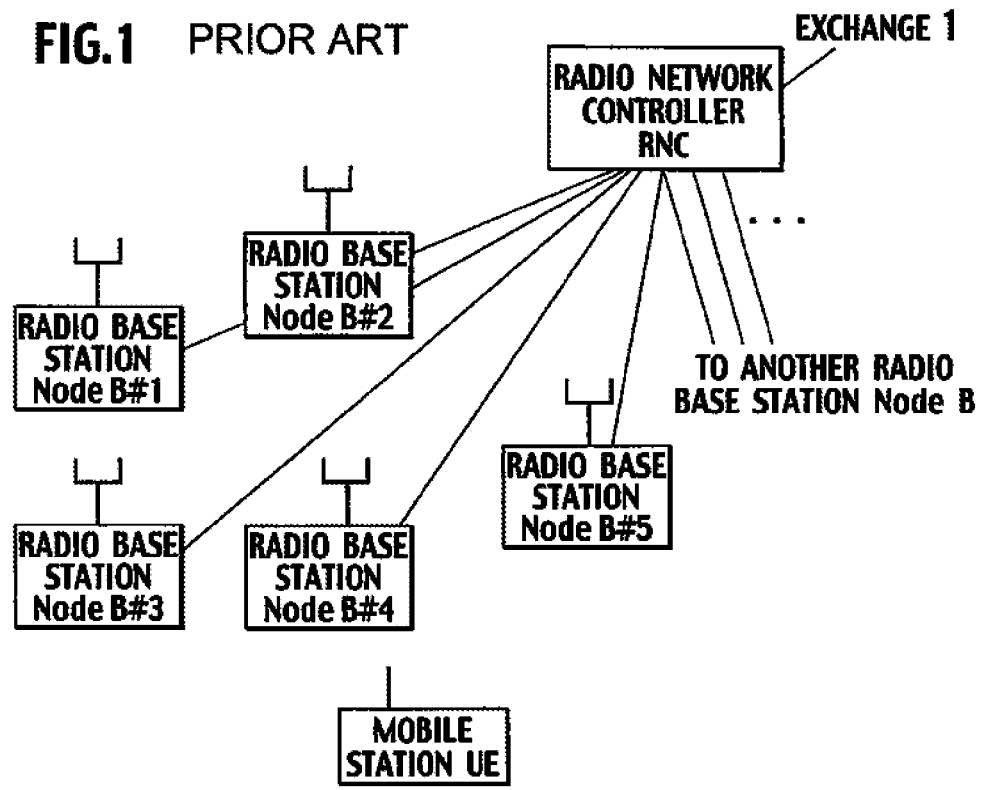
FIG. 1 is diagram of an entire configuration of a general mobile communication system.
Figure 2A:
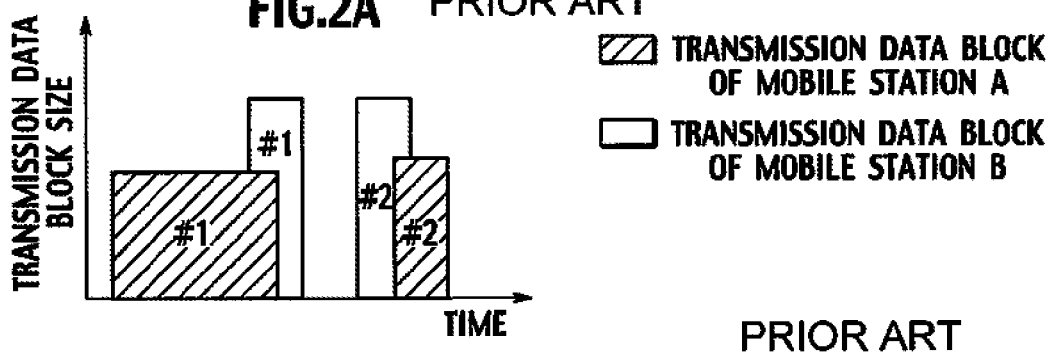
FIGS. 2A to 2C are graphs illustrating operations at the time of burst data transmission in a conventional mobile communication system.
Figure 2B:
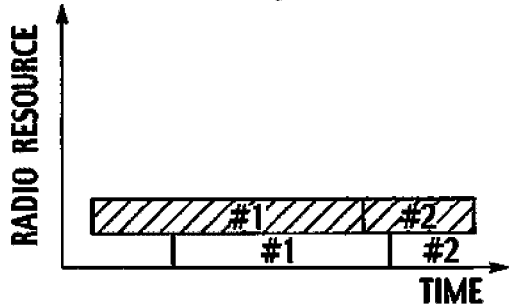
Figure 2C:
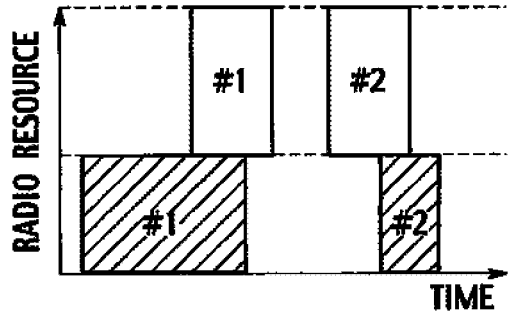

It should be noted that, as shown in FIG. 1, the mobile communication system according to this embodiment is provided with a plurality of radio base stations Node B #1 to Node B #5 and a radio network controller RNC.

In the mobile communication system according to this embodiment, a "High Speed Downlink Packet Access (HS-DPA)" is used in a downlink, and an "Enhanced Uplink (EUL)" is used in an uplink.

It should be noted that in both of the HSDPA and the EUL, retransmission control (N process stop and wait) shall be performed by a "Hybrid Automatic Repeat Request (HARQ)".

Therefore, in an uplink, an "Enhanced Dedicated Physical Channel (E-DPCH)" configured of an "Enhanced Dedicated Physical Data Channel (E-DPDCH)" and an "Enhanced Dedicated Physical Control Channel (E-DPCCH)", and a "Dedicated Physical Channel (DPCH)" configured of a "Dedicated Physical Date Channel (DPDCH)" and a "Dedicated Physical Control Channel (DPCCH)" are used.

Here, the E-DPCCH transmits control data for the EUL such as a transmission format number for defining a transmission format (transmission block size, or the like) of the EDPDCH, HARQ related information (the number of retransmission, or the like), and scheduling related information (transmission power, buffer residence-volume, or the like in the mobile station UE).

In addition, the E-DPDCH is paired with the E-DPCCH, and transmits user data for the mobile station UE based on the control data for the EUL transmitted through the E-DPCCH.

The DPCCH transmits control data such as a pilot symbol that is used for RAKE combining, SIR measurement, or the like, a Transport Format Combination Indicator (TFCI) for identifying a transmission format of uplink DPDCH, and a downlink power control bit in a downlink.

In addition, the DPDCH is paired with the DPCCH, and transmits user data for the mobile station UE based on the control data transmitted through the DPCCH. However, if user data that should be transmitted does not exist in the mobile station UE, the DPDCH configure to not to be transmitted.

In addition, in the uplink, a "High Speed Dedicated Physical Control Channel (HS-DPCCH)" which are needed when the HSPDA is applied, and a "Random Access Channel (RACH)", are also used.

The HS-DPCCH transmits a Channel Quality Indicator (CQI) in a downlink and an acknowledge signal (Ack or Nack) for the HS-DPCCH.

As shown in FIG. 4, the mobile station UE according to this embodiment is provided with a bus interface 31, a call processing section 32, a baseband processing section 33, a radio frequency (RF) section 34, and a transmission-reception antenna 35.

However, these functions can be independently present as hardware, and can be partly or entirely integrated, or can be configured through a process of software.

The bus interface 31 is configured to forward the user data output from the call processing section 32 to another functional section (for example, an application related functional section). In addition, the bus interface 31 is configured to forward the user data transmitted from another functional section (for example, the application related functional section) to the call processing section 32.

The call processing section 32 is configured to perform a call control processing for transmitting and receiving the user data.

The baseband signal processing section 33 is configured to transmit the user data to the call processing section 32, the user data acquired by performing, against the baseband signals transmitted from the RF section 34, a layer-1 processing including a despreading processing, a RAKE combining processing, and a "Forward Error Correction (FEC)" decode processing, a "Media Access Control (MAC)" processing including a MAC-e processing and a MAC-d processing, and a "Radio Link Control (RLC)" processing.

In addition, the baseband signal processing section 33 is configured to generate the baseband signals by performing the RLC processing, the MAC processing, or the layer-1 processing against the user data transmitted from the call processing section 32 so as to transmit the baseband signals to the RF section 34.

Detailed description of the functions of the baseband signal processing section 33 will be given later.

The REF section 34 is configured to generate baseband signals by performing the detection processing, the filtering processing, the quantization processing, or the like against radio frequency signals received through the transmission-reception antenna 35, so as to transmit the generated baseband signals to the baseband signal processing section 33.

In addition, the RF section 34 is configured to convert the baseband signals transmitted from the baseband signal processing section 33 to the radio frequency signals.

As shown in FIG. 5, the baseband signal processing section 33 is provided with a RLC processing section 33*a*, a MAC-d processing section 33*b*, a MAC-e processing section 33*c*, and a layer-1 processing section 33*d*.

The RLC processing section 33*a* is configured to transmit, to the MAC-d processing section 33*b*, the user data transmitted from the call processing section 32 by performing a processing (RLC processing) in an upper layer of a layer-2 against the user data.

The MAC-d processing section 33*b* is configured to grant a channel identifier header, and to create a transmission format in the uplink based on the limitation of transmission power.

In addition, as shown in FIG. 6, the layer-1 processing section 33*d* is provided with a control information receiving section 33*d*1, an EDCH transmission power ratio-TBS correspondence table storing section 33*d*2, and a user data transmitting section 33*d*3.

The control information receiving section 33*d*1 is configured to receive, from the radio network controller RNC, the layer-1 and the layer-2 related control information, via the call processing section 32.

The EDCH transmission power ratio-TBS correspondence table storing section 33*d*2 is configured to extract a correspondence table of the transmission data block size of scheduling information and the EDCH transmission power ratio of the scheduling information, from the layer-2 related control information which is received by the control information receiving section 33*d*1, and to store the correspondence table.

The user data transmitting section 33*d*8 is configured to transmit the uplink user data using the transmission power ratio (transmission rate). Here, the transmission power ratio (transmission rate) is determined using the correspondence table of the transmission data block size and the EDCH transmission power ratio stored in the EDCH transmission power ratio-TBS correspondence table storing section 33*d*2.

As shown in FIG. 7, the MAC-e processing section 33*c* is provided with an Enhanced Transport Format Combination (E-TFC) selecting section 33*c*1 and an HARQ processing section 33*c*2.

The E-TFC selecting section 33*c*1 is configured to determine a transmission format (E-TFC) of the E-DPDCH and the E-DPCCH, based on scheduling signals transmitted from the radio base station Node B.

In addition, the E-TFC selecting section 33*c*1 is configured to transmit transmission format information on the determined transmission format (that is, a transmission data block size, an transmission power ratio between the E-DPDCH and the DPCCH, or the like) to the layer-1 processing section 33*d*, and also to transmit the determined transmission data block size or the transmission power ratio to the HARQ processing section 33*c*2.

Such a scheduling signal is information that is signaled in the cell where the mobile station UE is located, and includes control information for all the mobile stations located in the cell, or a specific group of the mobile stations located in the cell.

The HARQ processing section 33*c*2 is configured to perform process control for the "N process stop and wait", so as to transmit the user data in the uplink based on an acknowledge signal (Ack/Nack for uplink data) transmitted from the radio base station Node B.

Specifically, the HARQ 33*c*2 is configured to determine whether or not the receive processing of downlink user data has been successful based on the result of the "Cyclic Redundancy Check (CRC)" entered from the first layer processing section 33*d*.

Then, the HARQ processing section 33*c*2 is configured to generate an acknowledge signal (Ack/Nack for downlink user data) based on the determined result, so as to transmit the acknowledge signal to the layer-1 processing section 33*d*.

In addition, the HARQ processing section 33*c*2 is configured to transmit, to the MAC-d processing 33*b*, the downlink user data entered from the layer-1 processing section 33*d* when the above-described determination result has been successful.

As shown in FIG. 8, the radio base station Node B according to this embodiment is provided with an HWY interface 11, a baseband signal processing section 12, a call control section 13, at least one transmitter-receiver section 14, at least one amplifier section 15, and at least one transmission-reception antenna 16.

The HWY interface 11 is an interface with a radio network controller RNC. Specifically, the HWY interface 11 is configured to receive user data transmitted from the radio network controller RNC to a mobile station UE via a downlink, so as to enter the user data to the baseband signal processing section 12.

In addition, the HWY interface 11 is configured to receive control data for the radio base station Node B from the radio network controller RNC, so as to enter the received control data to the call control section 13.

In addition, the HWY interface 11 is configured to acquire, from the baseband signal processing section 12, the user data included in the uplink signals which are received from a mobile station UE via an uplink, so as to transmit the acquired user data to the radio network controller RNC.

Further, the HWY interface 11 is configured to acquire the control data for the radio network controller RNC from the call control section 13, so as to transmit the acquired control data to the radio network controller RNC.

The baseband signal processing section 12 is configured to generate baseband signals by performing the RLC processing, the MAC processing (the MAC-d processing and the MAC-e processing), or the layer-1 processing against the user data acquired from the HWY interface 11, so as to forward the generated baseband signals to the transmitter-receiver section 14.

Here, the MAC processing in the downlink includes an HARQ processing, a scheduling processing, a transmission rate control processing, or the like.

In addition, the layer-1 processing in the downlink includes a channel coding processing of user data, a spreading processing, or the like.

In addition, the baseband signal processing section 12 is configured to extract user data by performing the layer-1 processing, the MAC processing (the MAC-e processing and the MAC-d processing), or the RLC processing against the baseband signals acquired from the transmitter-receiver section 14, so as to forward the extracted user data to the HWY interface 11.

Here, the MAC-e processing in the uplink includes the HARQ processing, the scheduling processing, the transmission rate control processing, a header disposal processing, or the like.

In addition, the layer-1 processing in the uplink includes the despreading processing, the RAKE combining processing, the error correction decode processing, or the like.

Detailed description of the functions of the baseband signal processing section 12 will be given later.

The call control section 13 is configured to perform the call control processing based on the control data acquired from the HWY interface 11.

The transmitter-receiver section 14 is configured to perform processing of converting baseband signals, which are acquired from the baseband signal processing section 12, to radio frequency signals (downlink signals), so as to transmit the radio frequency signals to the amplifier section 15.

In addition, the transmitter-receiver 14 is configured to perform processing of converting the radio frequency signals (uplink signals), which are acquired from the amplifier section 15, to the baseband signals, so as to transmit the baseband signals to the baseband signal processing section 12.

The amplifier section 15 is configured to amplify the downlink signals acquired from the transmitter-receiver section 14, so as to transmit the amplified downlink signals to the mobile station UE via the transmission-reception antenna 16.

In addition, the amplifier 15 is configured to amplify the uplink signals received by the transmission-reception antenna 16, so as to transmit the amplified uplink signals to the transmitter-receiver section 14.

As shown in FIG. 9, the baseband signal processing section 12 is provided with a RLC processing section 121, a MAC-d processing section 122, and a MAC-e and first layer processing section 123.

The MAC-e and layer-1 processing section 123 is configured to perform, against the baseband signals acquired from the transmitter-receiver section 14, the despreading processing, the RAKE combining processing, the error correction decode processing, the HARQ processing, or the like.

The MAC-d processing section 122 is configured to perform a header disposal processing against output signals from the MAC-e and layer-1 processing section 123.

The RLC processing section 121 is configured to perform, against the output signals from the MAC-d processing section 122, the retransmission control processing in the RLC layer or the reestablishment processing of RLC-Service Data Section (SDU).

However, these functions are not clearly divided per hardware, and can be obtained by software.

As shown in FIG. 10, the MAC-e and layer-1 processing section (configuration for the uplink) 123 is provided with a DPCCH RAKE section 123*a*, a DPDCH RAKE section 123*b*, an E-DPCCH RAKE section 123*c*, an E-DPDCH RAKE section 123*d*, an HS-DPCCH RAKE section 123*e*, a RACH processing section 123*f*, a Transport Format Combination Indicator (TFCI) decoder section 123*g*, buffers 123*h* and 123*m*, re-despreading sections 123*i* and 123*n*, FEC decoder sections 123*j* and 123*p*, an E-DPCCH decoder section 123*k*, a MAC-e functional section 123*l*, an HARQ buffer 123*o*, a MAC-hs functional section 123*q*, and an reception power measurement section 123*r*.

The E-DPCCH RAKE section 123*c* is configured to perform, against the E-DPCCH in the baseband signals transmitted from the transmitter-receiver section 14, the despreading processing and the RAKE combining processing using a pilot symbol included in the DPCCH.

The E-DPCCH decoder section 123*k* is configured to acquire transmission format number related information, HARQ related information, scheduling related information, or the like, by performing the decode processing against the RAKE combining outputs of the E-DPCCH RAKE section 123*c*, so as to enter the information to the MAC-e functional section 123*l*.

The E-DPDCH RAKE section 123*d* is configured to perform, against the E-DPDCH in the baseband signals transmitted from the transmitter-receiver section 14, the despreading processing using the transmission format information (the number of codes) transmitted from the MAC-e functional section 123*l* and the RAKE combining processing using the pilot symbol included in the DPCCH.

The buffer 123*m* is configured to store the RAKE combining outputs of the E-DPDCH RAKE section 123*d* based on the transmission format information (the number of symbols) transmitted from the MAC-e functional section 123*l*.

The re-despreading section 123*n* is configured to perform the despreading processing against the RAKE combining outputs of the E-DPDCH RAKE section 123*d*, based on the transmission format information (spreading factor) transmitted from the MAC-e functional section 123*l*.

The HARQ buffer 123*o* is configured to store the despreading processing outputs of the re-despreading section 123*n*, based on the transmission format information transmitted from the MAC-e functional section 123*l*.

The FEC decoder section 123*p* is configured to perform an error correction decoding processing (the FEC decode processing) against the despreading processing outputs of the re-despreading section 123*n*, which is stored in the HARQ buffer 123*o*, based on the transmission format information (transmission data block size) transmitted from the MAC-e functional section 123*l*.

The MAC-e functional section 123*l* is configured to calculate and output the transmission format information (the number of codes, the number of symbols, spreading factor, transmission data block size, or the like) based on the transmission format number related information, the HARQ related information, the scheduling related information, or the like, which are acquired from the E-DPCCH decoder section 123*k*.

In addition, as shown in FIG. 11, the MAC-e functional section 123*l* is provided with a receive processing command section 123/1, an HARQ controlling section 123/2, and a scheduling section 123/3.

The receive processing command section 123/1 is configured to transmit the transmission format number related information, the HARQ related information, and the scheduling related information, which are entered from the E-DPCCH decoder section 123*k*, to the HARQ controlling section 123/2.

In addition, the receive processing command section 123/1 is configured to transmit, to the scheduling section 123/3, the scheduling related information entered from the E-DPCCH decoder 123*k*.

Further, the receive processing command section 123/1 is configured to output the transmission format information corresponding to the transmission format number entered from the E-DPCCH decoder section 123*k*.

The HARQ controlling section 123/2 is configured to determine whether or not the receive processing of uplink user data has been successful, based on the result of CRC entered from the FEC decoder section 123*p*.

Then, the HARQ controlling section 123/2 is configured to generate an acknowledge signal (Ack or Nack), based on the determination result, so as to transmit the generated acknowledge signal to the configuration for the downlink of the baseband signal processing section 12.

In addition, the HARQ controlling section 123/2 is configured to transmit the uplink user data entered from the FEC decoder section 123*p* to the radio network controller RNC, when the above determination result has been successful.

In addition, the HARQ controlling section 123/2 is configured to clear soft decision values stored in the HARQ buffer 123*o*, when the above determination result has been successful.

On the other hand, the HARQ controlling section 123/2 is configured to store, in the HARQ buffer 123*o*, the uplink user data, when the above determination result has not been successful.

In addition, the HARQ controlling section 123/2 is configured to forward the above determination result to the receive processing command section 123/1.

The receive processing control command section 123/1 is configured to notify the E-DPDCH RAKE section 123*d* and the buffer 123*m* of an hardware resource that should be prepared for the following transmission time interval (TTI), so as to perform notification for reserving the resource in the HARQ buffer 123*o*.

In addition, when the uplink user data is stored in the buffer 123*m*, the receive processing command section 123/1 is configured to designate the HARQ buffer 123*o* and the FEC decoder section 123*p* to perform the FEC decoding processing after adding the uplink user data, which is stored in the HARQ buffer 123*o*, in a process corresponding to the TTI and a newly received uplink user data, per TTI.

In addition, the scheduling section 123/3 is configured to transmit the scheduling signals (AGCH, RGCH, or the like) via configuration for the downlink.

The radio network controller RNC according to this embodiment is an apparatus located in an upper level of the radio base station Node B, and is configured to control radio communications between the radio base station Node B and the mobile station UE.

As shown in FIG. 12, the radio network controller RNC according to this embodiment is provided with an exchange interface 51, a Logical Link Control (LLC) layer processing section 52, a MAC layer processing section 53, a media signal processing section 54, a radio base station interface 55, and a call control section 56.

The exchange interface 51 is an interface with an exchange 1, and is configured to forward the downlink signals transmitted from the exchange 1 to the LLC layer processing section 52, and to forward the uplink signals transmitted from the LLC layer processing section 52 to the exchange 1.

The LLC layer processing section 52 is configured to perform an LLC sub-layer processing such as a synthesis processing of a header such as a sequence number or a trailer.

The LLC layer processing section 52 is also configured to transmit the uplink signals to the exchange interface 51 and to transmit the downlink signals to the MAC layer processing section 53, after the LLC sub-layer processing is performed.

The MAC layer processing section 53 is configured to perform a MAC layer processing such as a priority control processing or a header granting processing.

The MAC layer processing section 53 is also configured to transmit the uplink signals to the LLC layer processing section 52 and to transmit the downlink signals to the radio base station interface 55 (or a media signal processing section 54), after the MAC layer processing is performed.

The media signal processing section 54 is configured to perform a media signal processing against voice signals or real time image signals.

The media signal processing section 54 is also configured to transmit the uplink signals to the MAC layer processing section 53 and to transmit the downlink signals to the radio base station interface 55, after the media signal processing is performed.

The radio base station interface 55 is an interface with the radio base station Node B. The radio base station interface 55 is configured to forward the uplink signals transmitted from the radio base station Node B to the MAC layer processing section 53 (or the media signal processing section 54) and to forward the downlink signals transmitted from the MAC layer processing section 53 (or the media signal processing section 54) to the radio base station Node B.

The call control section 56 is configured to perform a radio resource control processing, a channel setup by the layer-3 signaling, and open processing, or the like. Here, the radio resource control processing includes call admission control processing, handover processing, or the like.

In addition, the call control section 56 is configured to notify the correspondence table (correspondence) of the transmission data block size (TBS) of scheduling information and the EDCH transmission power ratio of the scheduling information, to the mobile station UE and the radio base station Node B, when a setup of channel connection for transmitting uplink user data is performed (i.e., when the call setup is performed) with the mobile station UE.

(Operations of Mobile Communication System According to First Embodiment of the Present Invention)

Referring to FIG. 13, operations of the mobile communication system according to this embodiment of the present invention will be described.

As shown in FIG. 13, in step S101, uplink user data to be transmitted is occurred.

Then, in step S102, a mobile station UE determines transmission power ratio of scheduling information using a correspondence table of transmission data block size and EDCH transmission wave amplitude ratio of the scheduling information which is received from a radio network controller, so as to notify the determined transmission power ratio of the scheduling information to a radio base station Node B.

In step S103, when the mobile station UE receives Ack and Absolute Grant Channel (AGCH) which correspond to the scheduling information in step S102, the mobile station UE transmits the uplink user data based on an absolute value of maximum allowable transmission rate notified by the AGCH.

(Actions and Effects of Mobile Communication System According to First Embodiment of the Present Invention)

According to the mobile communication system of this embodiment, the mobile station UE determines the transmission power ratio of scheduling information using the correspondence table of the transmission data block size and the EDCH transmission wave amplitude ratio of the scheduling information even when transmitting the scheduling information independently.

Therefore, in this embodiment, it is possible to decrease the transmission delay due to the retransmission of scheduling information, and to increase the transmission efficiency.

(Configuration of Mobile Communication System According to Second Embodiment of the Present Invention)

In a mobile communication system according to second embodiment of the present invention, a radio network controller RNC is configured to notify a correspondence table (correspondence) of transmission data block size and EDCH transmission power ratio of upper layer flow (uplink user data) to a mobile station UE and a radio base station Node B.

In addition, the radio network controller RNC is configured to notify an upper layer flow identifier, so as to notify which correspondence table of the transmission data block size and the EDCH transmission power ratio of the upper layer flow is used among the correspondence tables of the transmission data block size and the EDCH transmission power ratio of the upper layer flow.

The mobile station UE is configured to control a correspondence table of the transmission data block size and the EDCH transmission power ratio per upper layer flow.

In addition, the mobile station UE is configured to determine the EDCH transmission power ratio of the scheduling information to be transmitted (layer-2 control information) using the correspondence table of the transmission data block size and the EDCH transmission power ratio of upper layer flow which corresponds to the upper layer flow identifier notified from the radio network controller RNC.

Then, the mobile station UE is configured to transmit the scheduling information independently, using the determined EDCH transmission power ratio.

The radio base station Node B is configured to control correspondence of the transmission data block size and the EDCH transmission power ratio per upper layer flow.

In addition, the radio base station Node B is configured to allocate a receive processing resource for the scheduling information, on the assumption that the mobile station transmits the scheduling information using the EDCH transmission power ratio which is determined based on the correspondence table of the transmission data block size and the EDCH transmission power ratio of the upper layer flow, which corresponds to the upper layer flow identifier notified from the radio network controller.

According to the mobile communication system of this embodiment, the mobile station UE transmits the scheduling information using the EDCH transmission power ratio which is determined based on the correspondence table of the transmission data block size and the EDCH transmission power ratio of the upper layer flow, which corresponds to the upper layer flow identifier notified from the radio network controller.

Therefore, it is possible to prevent the increase of signaling, to select the scheduling information using the optimal correspondence table of the transmission data block size and the EDCH transmission power ratio of the upper layer flow from a plurality of upper layer flows, and to increase the communication quality of scheduling information.

(Configuration of Mobile Communication System According to Third Embodiment of the Present Invention)

In a mobile communication system according to third embodiment of the present invention, a radio network controller RNC is configured to notify a correspondence table of transmission data block size and EDCH transmission power ratio of upper layer flow, to a mobile station UE and a radio base station Node B.

The mobile station UE is configured to control a correspondence table of the transmission data block size and the EDCH transmission power ratio per upper layer flow.

In addition, the mobile station UE is configured to determine the EDCH transmission power ratio of the scheduling information to be transmitted (layer-2 control information) using the correspondence table of the transmission data block size and the EDCH transmission power ratio of the upper layer flow which has the highest priority level, so as to transmit the scheduling information using the determined EDCH transmission power ratio.

The radio base station Node B is configured to control correspondence of the transmission data block size and the EDCH transmission power ratio per upper layer flow.

In addition, the radio base station Node B is configured to allocate a receive processing resource for the scheduling information, on the assumption that the mobile station transmits the scheduling information using the EDCH transmission power ratio which is determined based on the correspondence table of the transmission data block size and the EDCH transmission power ratio of the upper layer flow which has the highest priority level.

According to the mobile communication system of this embodiment, the mobile station UE transmits the scheduling information using the EDCH transmission power ratio which is determined based on the correspondence table of the transmission data block size and the EDCH transmission power ratio of the upper layer flow which has the highest priority level.

Therefore, it is possible to prevent the increase of signaling. Furthermore, the mobile station UE determines the EDCH transmission power ratio of scheduling information using the correspondence table of the transmission data block size and the EDCH transmission power ratio of the upper layer flow which has the highest priority level.

The present invention can provide a transmission rate control method, a mobile station, a radio base station, and a radio network controller, which decrease the transmission delay due to the retransmission of scheduling information and increase the transmission efficiency, in a mobile communication system using the "Enhanced Uplink".

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A transmission rate control method for controlling transmission rate of scheduling information in a media access control sub-layer; characterized by notifying, from a radio network controller, a correspondence of a transmission data block size of the scheduling information to a transmission wave amplitude ratio between an enhanced dedicated physical data channel and a dedicated physical control channel of the scheduling information, to a mobile station; and transmitting, at the mobile station, the scheduling information, based on the notified correspondence.

2. A transmission rate control method for controlling transmission rate of scheduling information in a media access control sub-layer; characterized by notifying, from a radio network controller, at least one correspondence of a transmission data block size of at least one uplink user data flow to a transmission power ratio between an enhanced dedicated physical data channel and a dedicated physical control channel of the uplink user data flow, to a mobile station; and transmitting, at the mobile station, the scheduling information, based on the correspondence of an uplink user data flow which has a highest priority level.

3. A radio network controller for controlling transmission rate of scheduling information in a media access control sub-layer; characterized by a call control section configured to notify a correspondence of a transmission data block size of the scheduling information to a transmission wave amplitude ratio between an enhanced dedicated physical data channel and a dedicated physical control channel of the scheduling information in addition to a correspondence of a transmission data block size of uplink user data to a transmission wave amplitude ratio between an enhanced dedicated physical data channel and a dedicated physical control channel of uplink user data, to a mobile station and a radio base station, when a setup of a channel connection for transmitting uplink user data is performed with the mobile station.

4. A mobile station for controlling transmission rate of scheduling information in a media access control sub-layer; characterized by a control information receiving section configured to receive, from a radio network controller, a correspondence of a transmission data block size of the scheduling information to a transmission wave amplitude ratio between an enhanced dedicated physical data channel and a dedicated physical control channel of the scheduling information; and a user data transmitting section configured to transmit the scheduling information independently, based on the received correspondence.

5. A mobile station for executing a transmission rate control method for controlling transmission rate of scheduling information in a media access control sub-layer, comprising;

a control information receiving section configured to receive, from a radio network controller, at least one correspondence of a transmission data block size of at least one uplink user data flow to a transmission power ratio between an enhanced dedicated physical data channel to a dedicated physical control channel of the uplink user data flow; and a user data transmitting section configured to transmit the scheduling information, based on the correspondence of the uplink user data flow which has a highest priority level.

6. A mobile communication system for executing a transmission rate control method for controlling transmission rate of scheduling information in a media access control sub-layer, comprising;

a radio network controller configured to notify at least one correspondence of a transmission data block size of at least one uplink user data flow to a transmission power ratio between an enhanced dedicated physical data channel and a dedicated physical control channel of the uplink user data flow, to a mobile station; and the mobile station configured to transmit the scheduling information, based on the correspondence of an uplink user data flow which has a highest priority level.

7. A mobile communication system for executing a transmission rate control method for controlling transmission rate of scheduling information in a media access control sub-layer, comprising:

a radio network controller configured to notify a correspondence of a transmission data block size of the scheduling information, to a transmission wave amplitude ratio between an enhanced dedicated physical data channel and a dedicated physical control channel of the scheduling information, to a mobile station; and the mobile station configured to transmit the scheduling information, based on the notified correspondence.

* * * * *